UNITED STATES PATENT OFFICE.

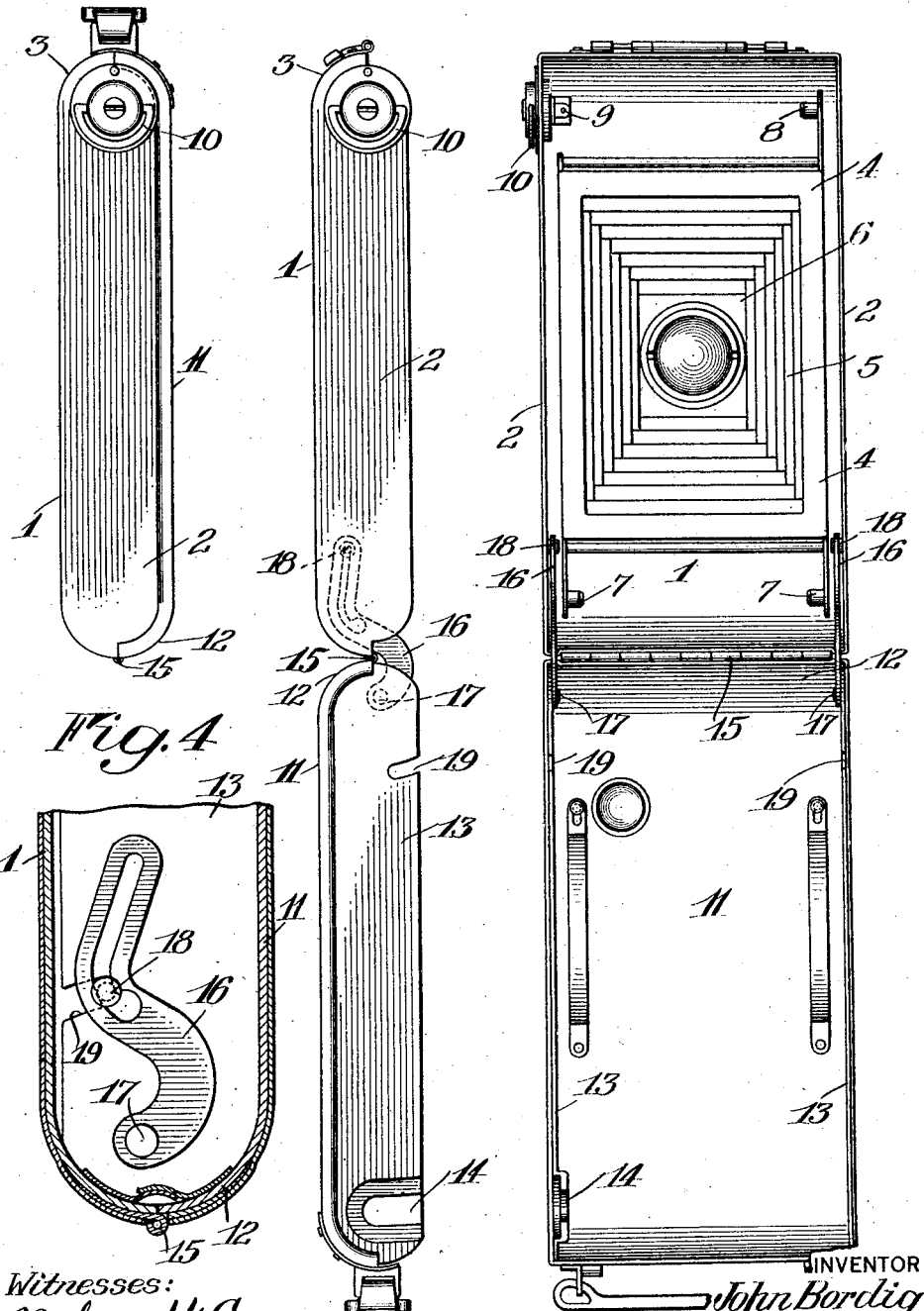

JOHN BORDIGION, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,418,280.  Specification of Letters Patent.  Patented June 6, 1922.

Application filed October 28, 1918. Serial No. 259,931.

*To all whom it may concern:*

Be it known that I, JOHN BORDIGION, a subject of the King of Italy, residing at Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference numerals marked thereon.

My present invention relates to photographic film cameras of the folding type in which the body of the camera or the portion containing film rolls is composed of a main portion and a cover portion adapted to be separated for the insertion and removal of the film spools, and it has for its object to provide a construction whereby the parts may be hinged or maintained in permanent engagement but may be readily opened and closed without liability of damaging the parts. To these and other ends the invention resides in certain improvements and combinations of parts all as will be hereinafter more fully described, the novel features being pointed out in the claims at the end of the specification.

In the drawings:

Figure 1 is a side elevation of a camera casing embodying my improvements, with the parts closed or in folded position;

Figure 2 is a similar view with the parts open;

Figure 3 is a rear elevation showing the parts in the position shown in Figure 2;

Figure 4 is a sectional view of one end of the camera showing one of the links for controlling the movement of the cover.

Similar reference numerals throughout the several views indicate the same parts.

The main body or frame of the camera is preferably composed of sheet metal, comprising the front plate 1 having the side plates 2 formed thereon, the ends of the casing thus formed being rounded as at 3 for about half the depth of the sides 2, and located at the rear portion of this frame is the plate 4 to which the rear end of the bellows 5 is connected, the front end of the bellows carrying the lens support 6, as shown in Figure 3, but as the bellows and lens form no part of my present invention, further illustration is deemed unnecessary. Chambers for containing the film spool are formed between the ends of the casing and the frame 4, suitable spool holding devices or pintles 7 being provided in the chamber, at one end. A spool holding pintle 8 is provided in the chamber at the opposite end, opposed to a film winding stud 9 journaled in the casing in any suitable manner and operated by the folding handle or bail 10 on the exterior of the camera, as shown. 11 indicates the cover or complementary part of the camera casing preferably constructed of sheet metal, covered, as usual, with leather or similar material and comprising a plate having the curved ends 12 and the flanges 13 at the sides which are substantially the depth of the casing. One of these side flanges is provided with a slot 14 for the accommodation of the film winding stud 9 when the parts are closed, and both flanges 13 extend inside of and parallel with the flanges 2 of the main body of the camera frame, so as to form a light-tight joint when the parts are closed. The cover 11 is hinged at 15 to the main casing of the camera above the front and about midway of the depth thereof. The opening movement is limited by links or members 16 pivoted at 17 to one of the parts, preferably to the plates or flanges 13 of the cover, said links being curved in substantially ogee form and provided in the portions opposite the pivots with longitudinally extending curved slots in which operate the shanks of the headed projections 18 secured to the inner sides of the casing. The side flanges 13 of the cover are cut away or slotted at 19 to prevent engagement with the shanks of the projections 18. The pins 17 and 18 and the links 16 are so shaped and arranged relatively to the hinge between the main frame and cover that when the cover is opened, as shown in Figure 2, the pins 18 will be at the ends of the slots in the links so as to limit the opening movement beyond that shown in Figure 2 and allow the two parts to extend substantially parallel whether the parts are held in the hand or laid upon a table or bench when film spools are to be inserted and removed, but preventing undue strain upon the hinge when the camera is held by either of the parts. The shape of the curved slots in the links and their relation to the pins is such also that when the cover is closed the links occupy the position shown in Figure 4 and during the opening and closing movements of the cover, the ends of the links are guided by the pins operating in the slots so that there will be no liability of the ends of the links engaging the front of the camera casing. The free end of the cover opposite the hinge is secured by any suitable form of catch such, for instance, as the sliding bolts shown in Figure 3.

I claim as my invention:

1. In a camera, the combination with a body member and a cover member hinged together at their ends and adapted when opened to lie substantially in the same plane and to occupy parallel planes when closed, of links pivoted to one member and extending over the hinge and guiding and limiting projections on the other member having sliding engagement with the free ends of the links, said parts being positioned to permit the relative movements of the members on the hinge until they are substantially in line with each other and then by their engagement arrest further movement.

2. In a camera, the combination with a body member, a cover member and a hinge connecting them arranged parallel with but between the planes of the front and rear faces of the members, of links pivoted to one member above the hinge extending across the hinge when the members are opened, said links having curved slots at their free ends and pins located on the other member below the hinge and occupying the curved slots.

3. In a camera, the combination with a body portion, a cover and a hinge connecting them arranged parallel with but between the planes of the front and rear faces of the members, of links pivoted to one member, extending over the hinge, having curved slots at their free ends, and pins on the other member engaging the slots, the pins and pivots being substantially diametrically opposed relatively to the hinge when the cover is extended.

4. The combination with a camera body member having rearwardly extending flanges at the sides, and spool centering devices at the ends, of a cover member hinged to the end of the body member above the front portion thereof and having the flanges extending parallel with those on the body member when the parts are closed, of links extending across the pivot pivoted at one end to one of the members and having curved slots at the opposite end and pins on the other member engaging said slots to limit the movements of the members.

JOHN BORDIGION.